United States Patent
Kogan (10) Patent No.: US 11,312,016 B2
(45) Date of Patent: Apr. 26, 2022

(54) METHOD AND SYSTEM FOR CONTROLLING A ROBOT ARRANGEMENT

(71) Applicant: KUKA Deutschland GmbH, Augsburg (DE)

(72) Inventor: Yevgen Kogan, Augsburg (DE)

(73) Assignee: KUKA Deutschland GmbH, Augsburg (DE)

(*) Notice: Subject to any disclaimer, the term of this patent is extended or adjusted under 35 U.S.C. 154(b) by 1065 days.

(21) Appl. No.: 15/758,756

(22) PCT Filed: Sep. 5, 2016

(86) PCT No.: PCT/EP2016/001499
§ 371 (c)(1),
(2) Date: Mar. 9, 2018

(87) PCT Pub. No.: WO2017/041885
PCT Pub. Date: Mar. 16, 2017

(65) Prior Publication Data
US 2020/0238521 A1  Jul. 30, 2020

(30) Foreign Application Priority Data
Sep. 11, 2015 (DE) ............ 10 2015 011 910.9

(51) Int. Cl.
*G06F 17/00* (2019.01)
*B25J 9/16* (2006.01)
(Continued)

(52) U.S. Cl.
CPC ............ *B25J 9/1674* (2013.01); *B25J 9/042* (2013.01); *B25J 9/163* (2013.01); *B25J 13/085* (2013.01);
(Continued)

(58) Field of Classification Search
CPC . B25J 9/1674; B25J 9/042; B25J 9/163; B25J 13/085; B25J 9/1682; G05B 19/406; G05B 2219/40582; G05B 2219/50193
(Continued)

(56) References Cited

U.S. PATENT DOCUMENTS 6,385,562 B1  5/2002 Roth et al.
9,409,295 B2* 8/2016 Ueberle ............... B25J 9/1651
(Continued)

FOREIGN PATENT DOCUMENTS

CN   1198375 A    11/1998
CN  103914035 A    7/2014
(Continued)

OTHER PUBLICATIONS

German Patent Office; Office Action in related German Patent Application No. 10 2015 011 910.9 dated Aug. 22, 2016; 5 pages.
(Continued)

*Primary Examiner* — Ronnie M Mancho
(74) *Attorney, Agent, or Firm* — Dorton & Willis, LLP (57) ABSTRACT

A method for controlling a robot arrangement having at least one robot includes monitoring the robot arrangement using multiple safety monitoring functions activated in parallel, and steps, which may be repeated multiple times during execution of an application of the robot arrangement, of: selecting a subset of process parameters from a prescribed set of process parameters on the basis of a prescribed rule arrangement having at least one selection rule, and adjusting this selected subset of process parameters to avoid violation of at least one of the safety monitoring functions.

20 Claims, 1 Drawing Sheet

(51) Int. Cl.
  *B25J 9/04* (2006.01)
  *B25J 13/08* (2006.01)
  *G05B 19/406* (2006.01)
(52) U.S. Cl.
  CPC .. *G05B 19/406* (2013.01); *G05B 2219/40582* (2013.01)
(58) Field of Classification Search
  USPC .......................................................... 700/245
  See application file for complete search history.

(56) References Cited

U.S. PATENT DOCUMENTS

| | | | | |
|---|---|---|---|---|
| 9,823,648 | B2* | 11/2017 | Euhus | ................ G05B 19/4097 |
| 2009/0271036 | A1* | 10/2009 | Kock | ..................... B25J 9/1666 |
| | | | | 700/245 |
| 2009/0307660 | A1* | 12/2009 | Srinivasan | ............. G06F 8/314 |
| | | | | 717/114 |
| 2011/0098829 | A1 | 4/2011 | Weddingfeld et al. | |
| 2013/0325030 | A1 | 12/2013 | Hourtash et al. | |
| 2013/0345875 | A1* | 12/2013 | Brooks | .................. G05B 19/42 |
| | | | | 700/259 |
| 2014/0195051 | A1* | 7/2014 | Bonin | ................... B25J 9/1676 |
| | | | | 700/253 |

FOREIGN PATENT DOCUMENTS

| | | |
|---|---|---|
| CN | 104363850 A | 2/2015 |
| CN | 104723350 A | 6/2015 |
| DE | 4432768 A1 | 4/1996 |
| DE | 10020074 A1 | 11/2001 |
| DE | 10240584 A1 | 3/2004 |
| DE | 102004043514 A1 | 3/2006 |
| DE | 102008015948 A1 | 10/2009 |
| DE | 102008060010 A1 | 6/2010 |
| DE | 102010020750 A1 | 11/2011 |
| DE | 102010048369 A1 | 4/2012 |
| DE | 102012011108 A1 | 12/2013 |
| DE | 10 2013 000 250 A1 | 7/2014 |
| DE | 102006046759 B4 | 5/2018 |
| EP | 1362269 B1 | 2/2005 |
| EP | 1847891 A1 | 10/2007 |
| EP | 2098926 A1 | 9/2009 |
| EP | 2113344 A1 * | 11/2009 ............ B25J 9/1674 |
| EP | 2158064 B1 | 4/2013 |
| EP | 2113344 B1 | 8/2018 |

OTHER PUBLICATIONS

European Patent Office; Search Report in related International Patent Application No. PCT/EP2016/001499 dated Nov. 11, 2016; 6 pages.
Chinese Patent Office; Office Action in related Chinese Patent Application No. 201680052810.9 dated Sep. 11, 2020; 3 pages.
Chinese Patent Office; Search Report in related Chinese Patent Application No. 201680052810.9 dated Sep. 3, 2020; 3 pages.
Chinese Patent Office; Second Office Action and Search Report in related Chinese Patent Application No. 201680052810.9 dated May 6, 2021; 8 pages.

* cited by examiner

METHOD AND SYSTEM FOR CONTROLLING A ROBOT ARRANGEMENT

CROSS-REFERENCE

This application is a national phase application under 35 U.S.C. § 371 of International Patent Application No. PCT/EP2016/001499, filed Sep. 5, 2016 (pending), which claims the benefit of German Patent Application No. DE 10 2015 011 910.9 filed Sep. 11, 2015, the disclosures of which are incorporated by reference herein in their entirety.

TECHNICAL FIELD

The present invention relates to a method for controlling a robot assembly comprising at least one robot as well as a system and a computer program product for carrying out the method.

BACKGROUND

The document EP 2 158 064 B1 discloses a method for the automated adaptation of a process parameter of a robot.

In the exemplary embodiment the various working zones of the robot are provided with different speed monitoring functions, which are activated in a manner allowing an alternative, depending on the pose of the robot. A controller automatically adjusts the speed of the robot to the speed monitoring function that is activated in each case. For this purpose the controller sets the speed of the robot to "stop" in the region of a shutter gate, as long as the shutter gate is open and in any other case to "slow". In the field relating to the cooperation between human and robot in a working space, the controller sets the speed of the robot to "stop", as long as a person is present and in any other case to "slow". In the rest of the working space the controller sets the speed of the robot to "slow", as long as the robot is located in a boundary region and in any other case to "high".

This automated adjustment of the speed makes it possible to prevent advantageously a violation of the speed monitoring function that is activated in each case.

It is known from the document DE 10 2013 000 250 A1 to link a number of safety monitoring functions in parallel and, only if none of these safety monitoring functions is violated, to execute a safety response that is linked to these safety monitoring functions.

In said exemplary embodiment a speed monitoring function, a tool monitoring function and an operator protection monitoring function are activated such that they are linked in parallel. Only in the event that both the speed monitoring function is violated due to exceeding a speed limit value and also the tool monitoring function is violated due to an activated laser tool as well as the operator protection monitoring function is violated due to a door of a protective room being opened, is a STOP1 triggered.

Consequently it may be advantageous to move slowly or, more specifically, below the speed limit value and vice versa to move faster or, more specifically, above the speed limit value, even if, for example, the laser tool is activated tool and/or the door of the protective room door is opened, as long as at least the laser tool is deactivated or the door of the protective room is closed.

If, however, a number of safety monitoring functions are activated in parallel, then in the past the process parameters, such as, for example, the speed, had to be adjusted individually by hand, a task that was time consuming and error prone, in order to avoid a parallel violation of all activated safety monitoring functions and, as a result, an execution of the safety response, linked thereto, since the method, known from the document EP 2 158 064 B1, is based on the fact that only one of the plurality of alternative safety monitoring functions is activated in each case, on the basis of which the process parameter, which is clearly associated with said one safety monitoring function, will then be adapted automatically.

SUMMARY

One object of the present invention is to improve the control of a robot assembly.

This object is achieved by a system and method as disclosed herein.

According to one embodiment of the present invention, a method for controlling a robot assembly comprising at least one robot comprises the step of:

monitoring the robot assembly by means of a plurality of parallel activated safety monitoring functions;

and the steps, repeated multiple times, in particular, during the execution of an application of the robot assembly, of:

selecting a subset of process parameters from a prescribed set of process parameters, wherein in a further development by means of the process parameters of the prescribed set, in particular, adaptation of the process parameters of the prescribed set, a violation of at least one of the safety monitoring functions is avoidable, on the basis of a prescribed control arrangement having at least one selection rule; and adapting this selected subset of process parameters or adapting the process parameter(s) of the selected subset, in order to avoid a violation of at least one of the safety monitoring functions, or in such a way that a violation of at least one of the safety monitoring functions is avoided.

Accordingly, in one embodiment of the present invention a system for controlling a or the robot assembly comprising at least one robot is configured, in particular, by means of hardware and/or software, in particular, by programming, for carrying out a method described herein; and/or said system comprises:

means for monitoring the robot assembly by means of a plurality of parallel activated safety monitoring functions;

means for the selection, repeated multiple times, in particular, during the execution of an application of the robot assembly and at least partially automated, of a subset of process parameters from a prescribed set of process parameters, wherein in a further development by means of the process parameters of the prescribed set, in particular, adaptation of the process parameters of the prescribed set, a violation of at least one of the safety monitoring functions is avoidable, on the basis of a prescribed control arrangement having at least one selection rule; and means for the adaptation, repeated multiple times, in particular, during the execution of the application of the robot assembly, of this selected subset of process parameters, in order to avoid a violation of at least one of the safety monitoring functions, or in such a way that a violation of at least one of the safety monitoring functions is avoided.

By means of the rule-based selection of a subset, it is possible in one embodiment to advantageously adapt one or more process parameters of the robot assembly in at least a partially automated way, in order to avoid a violation of (at least) one of the parallel activated safety monitoring functions. With respect to the adaptation of the selected (subset of) process parameter(s) reference is also made to the document EP 2 158 064 B1, cited in the introductory part of the specification; with respect to the parallel activated safety monitoring functions and, linked thereto, a safety response, reference is also made to the document DE 10 2013 000 250 A1, which is cited in the introductory part of the specification; and the contents of both which are hereby incorporated by reference in their entirety.

In one embodiment the robot assembly comprises one or more robots with a plurality, in particular, at least three, in particular, at least six, in particular, at least seven, (motion) axes, in particular, axes of rotation, which can be actuated or, in particular, are actuated by an electric motor.

In one embodiment at least one process parameter of the prescribed set of process parameters depends on (at least) one driving force of the robot assembly and/or a force, exerted by the robot assembly; said process parameter may, in particular, specify or describe this force.

For a more compact presentation even a pair of antiparallel forces or torque is referred to herein in a generalized sense as (a) force within the context of the present invention.

In addition or as an alternative, at least one process parameter of the prescribed set of process parameters may depend in one embodiment on a pose of the robot assembly and/or a time derivative of the pose, in particular, may specify or describe them, in particular, may depend on or may specify or describe a position and/or an orientation of one or more robot fixed or robot assembly fixed references, in particular, one or more TCPs, one or more joint coordinates, in particular, joint angles, of the robot or the robot assembly, and/or a respective speed and/or acceleration and/or higher time derivative.

A process parameter may be, in particular, one dimensional or a scalar or multidimensional, in particular, a vector.

In one embodiment the application may comprise a, in particular, prescribed and/or stored, control program of the or for the robot assembly, in particular, may be or might be defined or preset, in particular, by said control program. In one embodiment the control program specifies the (desired) movements of the robot(s) of the robot assembly and/or actions of, in particular, robot-guided, tools of the robot assembly. In particular, the, in particular, automated processing of the control program is referred to herein as the execution of the application.

In one embodiment a safety monitoring function comprises a, in particular, parameterizable, monitoring of (at least) one force, acting externally on the robot assembly, of (at least) one driving force of the robot assembly; of a pose of the robot assembly and/or of at least one time derivative thereof, in particular, as to whether the, in particular, parameterizable limits are exceeded and/or undershot.

In one embodiment the robot assembly is monitored by means of the parallel activated safety monitoring functions in that (each) of the safety monitoring functions monitors one or more actual process parameters of the robot assembly, in particular, one or more actual process parameters, which match or correspond to the (desired) process parameters of the prescribed set of process parameters or which depend on the same variable(s), in particular, describe or preset the same variable(s), in particular, the aforementioned force, pose and/or time derivative.

In one embodiment a violation of a safety monitoring function is or will be avoided or avoidable in accordance with the present invention, in particular, by adapting the process parameters, provided that or in that the process parameters are or will be adapted, in particular, are or will be specified, in particular, if required, and/or within preset limits, in such a way that a violation of the safety monitoring function, in particular, the amount, by which the limit values or the like are exceeded, is or will be minimized, in particular, does not occur.

Since a safety monitoring function may be violated, even in the case of (adapted) process parameters, for example, due to external events, the terms "avoidable/avoid/avoiding" are to be construed within the context of the present invention to mean, in particular, "avoidable/avoid/avoiding as far as possible." Thus, for example, an externally forced movement of the robot assembly into a forbidden pose may give rise to a violation of a pose safety monitoring function. Nevertheless, this violation of the pose safety monitoring function is or will be avoidable or avoided within the context of the present invention, provided that or in that in any case a permissible pose is or will be specified as the desired pose of the robot assembly.

A violation of a pose safety monitoring function may be avoidable or may be avoided, in particular, by means of a process parameter or the adaptation thereof, said process parameter being dependent on the pose of the robot assembly, in particular, specifying or presetting said pose. In particular, an adaptation in the form of a restriction of permissible or, more specifically, assumable poses may avoid a violation of a pose safety monitoring function or a space safety monitoring function within the context of the present invention.

Consequently a violation of a speed or acceleration safety monitoring function may or might be avoidable or avoided, in particular, by means of a process parameter or the adaptation thereof, said process parameter being dependent on the speed or acceleration of the robot assembly, in particular, specifying or presetting said speed or acceleration. In particular, an adaptation in the form of a restriction of permissible speeds or accelerations or a reduction in the speeds or accelerations may avoid a violation of a speed or acceleration safety monitoring function within the context of the present invention.

A violation of a force safety monitoring function may or might be avoidable or avoided, in particular, by means of a process parameter or the adaptation thereof, said process parameter being dependent on a driving force of the robot assembly, in particular, specifying or presetting said driving force. In particular, an adaptation in the form of a restriction of permissible driving forces may avoid a violation to a force safety monitoring function within the context of the present invention.

In one embodiment the prescribed set of process parameters, by means of which in a further development a violation of at least one of the safety monitoring functions is avoidable or may be avoided, is or will be optionally modified or modifiable, in particular, parameterized or parameterizable and/or expanded or expandable by one or more process parameters. In one embodiment the set of process parameters is or will be specified in such a way that by means of these process parameters or the adaptation thereof a violation of one or more of the parallel activated safety monitoring functions is avoidable or is avoided or can be avoided. In particular, the prescribed set of process parameters in one embodiment may comprise one or more process parameters, by means of which or the adaptation thereof a violation of one of the parallel activated safety monitoring functions is avoidable or is avoided or can be avoided, and one or more other process parameters, by means of which or the adaptation thereof a violation of another of the parallel activated safety monitoring functions is avoidable or is avoided or can be avoided.

In one embodiment at least one safety monitoring function monitors an actual process parameter of the robot assembly. Then in one embodiment a violation of this safety monitoring function may be avoidable or may be avoided, in particular, by adapting a (desired) process parameter, which matches or corresponds to this actual process parameter and which belongs to the prescribed set of process parameters, said (desired) process parameter being dependent on the same variable(s) of the robot assembly or specifying or presetting said variables.

Correspondingly in one embodiment one or more process parameters of the prescribed set of process parameters, by means of which in a further development a violation of at least one of the safety monitoring functions is avoidable or is avoided or can be avoided, is or are the desired process parameter(s). In particular, the prescribed set of process parameters may comprise a desired process parameter for specifying a pose, speed and/or acceleration of the robot assembly and/or a desired process parameter for presetting a driving force of the robot assembly and/or a desired process parameter for presetting a force exerted by the robot assembly.

In one embodiment one or more selection rules of the control arrangement assign (in each case) one of the safety monitoring functions, in particular, bijectively or uniquely, to one of the process parameters from the prescribed set of process parameters as a selectable subset, which consequently may also consist of an object or a process parameter (in each case), in particular, a desired process parameter, which matches or corresponds to an actual process parameter that is monitored by the safety monitoring functions. Thus, it is possible to use, in particular, a selection rule to assign a pose or space safety monitoring function to a process parameter as a selectable subset, said process parameter being dependent on the pose of the robot assembly, in particular, specifying or presetting said pose. In addition or as an alternative, a selection rule can be used to assign a speed or acceleration safety monitoring function to a process parameter as a selectable subset, said process parameter being dependent on a speed or acceleration of the robot assembly, in particular, specifying or presetting said speed or acceleration. In addition or as an alternative, a selection rule can be used to assign a force safety monitoring function to a process parameter as a selectable subset, said process parameter being dependent on a force, acting externally on the robot assembly; a driving force of the robot assembly; and/or a force, exerted by the robot assembly, in particular, specifying or presetting said force.

In particular, therefore, in one embodiment a process parameter may be selected advantageously as a subset, even on the basis, in particular, by selection, of the safety monitoring functions that are bijectively assigned to said process parameter. Thus, for example, by selecting a speed safety monitoring function as (at least) one safety monitoring function, which is not to be violated, it is possible to select a speed process parameter, associated with said speed safety monitoring function, as a subset; by selecting a force safety monitoring function as (at least) one safety monitoring function, which is not to be violated, it is possible to select a force process parameter associated with said force safety monitoring function.

In one embodiment it is possible to select, in particular, by means of the application, in particular, by means of a corresponding control command, one or more process parameters of the prescribed set of process parameters, as the process parameter(s) to be retained. Then in one embodiment a selection rule assigns to this or these process parameter(s), which is/are selected to be retained, in each case a subset of the prescribed set of process parameters as the selectable subset of process parameters to be adapted, where said subset to be selected does not contain these process parameters, which are to be retained, and is, in particular, is complementary thereto. If, for example, the prescribed set of process parameters consists of a force process parameter and a speed process parameter and if by means of the application a speed is selected as the one to be retained, then a selection rule of the control arrangement can select suitable force process parameters as a subset or the process parameters to be adapted and vice versa.

In one embodiment the selection can be fully automated or take place without asking for input by a user. Similarly there is the possibility, in particular, optionally, of also querying a user input or the possibility of providing such a querying, with which a user can select a subset, in particular, a process parameter, in particular, from a completely automated preselected subset or a pre-selection of possible subsets or process parameters, a feature that is referred to herein as a semi-automatic selection.

In one embodiment the control arrangement is stored. In one embodiment said control arrangement can be modified, in particular, parameterized, in particular, by the user and/or the application. In one embodiment one or more selection rules can be, in particular, (re-) parameterized, (re-) prioritized, added or activated and/or removed or deactivated, in particular, by a user and/or an application that is carried out or is to be carried out.

In one embodiment the process parameter(s) of the subset is or are adapted, if required, or only if in the case of non-adapted process parameter(s) all of the parallel activated safety functions were violated. Consequently a speed of a robot, which is below a speed limit value that is monitored by an activated safety monitoring function, does not have to be adapted, in particular, reduced.

In one embodiment a safety monitoring function can be activated or deactivated, based on a user input; the application, in particular, a prescribed control command of the application, and/or a state, in particular, a pose, of the robot assembly. In particular, in one embodiment a user input can be detected; and, based thereon, a safety monitoring function, determined by the input, can be activated or deactivated. In addition or as an alternative, the application may include a default for safety monitoring functions that are activated or are to be activated. In one embodiment, in particular, individual safety monitoring functions can be activated or deactivated by means of the stored control commands of the application. In addition or as an alternative, in one embodiment a safety monitoring function can be activated or deactivated, as soon as a robot of the robot assembly intrudes into a defined working space or exits a defined working space. In one embodiment a (de)activation of a safety function monitoring may modify the prescribed set of process parameters, by means of which in one further development a violation of at least one of the activated safety monitoring functions is avoidable or is avoided or can be avoided; in particular, said deactivation can add process parameters to said prescribed set or remove process parameters from said set.

In one embodiment a safety response of the robot assembly, said safety response being linked to the parallel activated safety monitoring functions, is carried out, only if said safety response is not counteracted or opposed by any of these safety monitoring functions. In particular, in one embodiment the safety response of the robot assembly, said safety response being linked to the parallel activated safety monitoring functions, is not carried out, provided that or as long as (at least) one of these safety monitoring functions is not or will not be violated. In this respect in one embodiment a safety response of the robot assembly, said safety response being linked to the parallel activated safety monitoring functions, is carried out, only if said safety response is not counteracted or opposed by a non-violation of these safety monitoring functions.

In one embodiment the prescribed control arrangement comprises a hierarchized plurality of prioritized selection rules, which are, in particular, modifiable among themselves. In one embodiment the subset of process parameters to be adapted is selected, based on a or the highest prioritized selection rule of the control arrangement. Consequently in one embodiment the control arrangement is hierarchized in such a way that one of the selection rules is or will always be prioritized unequivocally the highest.

In one embodiment one or more selection rules may be bijective (in each case) with the subset of process parameters to be adapted, said subset being determined by said one or more selection rules; or said one or more selection rules can always determine (in each case) the same subset of adaptable process parameters, in particular, may be identical to said subset. For example, a first selection rule may always determine a first subset of process parameters to be adapted; and a second selection rule may always determine a second subset of process parameters to be adapted.

In addition or as an alternative, in one embodiment one or more selection rules also determine (in each case), even as a function of a, in particular, the same or different, uni- or multi-dimensional additional condition(s), different subsets of process parameters to be adapted. For example, a selection rule determines a first subset of process parameters to be adapted, provided that the robot assembly is located in a first working space, and a second subset of process parameters to be adapted, provided that the robot assembly is located in a second working space.

Consequently in one embodiment one or more selection rule(s) of the control arrangement comprises or comprise (in each case) a hierarchized plurality of prioritized subsets of adaptable process parameters of the prescribed set of process parameters, said prioritized subsets being, in particular, modifiable among themselves. In one embodiment (based on the control arrangement) that subset of the control arrangement is selected that on the basis of the, in particular, single or the highest prioritized, selection rule is or will be prioritized the highest.

In one embodiment one or more selection rules, in particular, subsets of the process parameters to be adapted, are or will be prioritized on the basis of the application, in particular, higher or lower (re-) prioritized than their default or initial prioritization. This feature makes it possible to take advantageously into account, in particular, during the execution of the application, specifically different boundary conditions and/or to improve the operation and/or the safety of the robot assembly.

In one embodiment a selection rule, in particular, a subset of process parameters to be adapted is or will be prioritized the highest, based on the application, as a global selection rule or a default selection rule or a default subset. In particular, this global selection rule is or will be applied to the application or during the execution thereof; or this global subset of process parameters to be adapted is or will be selected, provided that or as long as subsequently no other selection rule or subset of process parameters to be adapted is or will be prioritized higher. In other words, in one embodiment an application-specific global selection rule or default selection rule or default subset is prescribed.

In addition or as an alternative, one or more selection rules, in particular, subsets of process parameters to be adapted might or may be (re-) prioritized, based on a prescribed control command of the application.

In this case in an embodiment a (re-) prioritization of one or more selection rules or subsets may be derived, indirectly or indirectly, from a prescribed process command of the application.

In a further development such a (re-) prioritization applies only during the execution or processing of the respective process command, so that after its execution or processing the foregoing prioritization or selection rule(s) applies or apply again.

Thus, it is possible to use, in particular, a process command (in) the application, which requires a force control, to infer that a desired force should be reached or maintained; and a speed process parameter may be selected through an appropriate prioritization of the selection rules or in a selection rule, in order to avoid a safety response by lowering (as required) the speed to the non-violation of a speed safety monitoring function, even though the force violates a parallel activated force safety monitoring function, in particular, (only) during the execution of the force control.

Conversely, in particular, a process command, which requires a position control, can be used to infer that that a contact free movement is anticipated, and a force process parameter may be selected accordingly by a suitable prioritization of the selection rules or in a selection rule, in order to avoid a safety response by, if necessary, lowering a force to the non-violation of a force safety monitoring function, although the speed violates a parallel activated speed safety monitoring function, in particular, (only) during the execution of the position control.

In other words, a selection rule may state that a force process parameter has to be selected, if a force control is present; and/or a speed process parameter has to be selected, if a position control is present.

In one embodiment, in addition or as an alternative, one or more selection rules or subsets are or will be prioritized, directly or indirectly, based on a prescribed (selection rule or subset) prioritization command. In particular, a (re-) prioritization can be explicitly commanded in this way in the application during (the execution) of the application.

In other words, in one embodiment the selectable subset of process parameters to be adapted can be specified directly in the application by means of a corresponding prioritization command.

Thus, a control command of the application may be, in particular, a prioritization command; and on the basis of said control command one or more selection rules, in particular, subsets of process parameters to be adapted will be or are (re-) prioritized. Said prioritization command specifies or commands the (re-) prioritization itself or directly or explicitly, in particular, exclusively specifies or commands the (re-) prioritization. Similarly a control command of the application may be, in particular, a process command; and on the basis of said control command one or more selection rules, in particular, subsets of process parameters to be adapted will be or are (re-) prioritized. Said process command does not itself or not directly or not explicitly specify or command a (re-) prioritization. A process command can be, in particular, a command, which specifies or commands, in particular, exclusively or also, a control or a modification of a control operating mode of the robot assembly and/or an activity, in particular, a motion, of the robot assembly.

In addition or as an alternative, one or more selection rules, in particular, sub-sets of the process parameters to be adapted might or may be (re-) prioritized, based on a state, in particular, a pose; a sensor value; or an I/O value, of the robot assembly. In particular, when the robot assembly intrudes into a defined working space and/or when the robot assembly exits a defined working space, one or more selection rules or subsets may be (re-) prioritized.

In one embodiment one or more of the steps of the method are carried out while the robot assembly is operating, in particular, while executing the application.

In one embodiment one or more of the steps, described herein, are repeated multiple times, in particular, while operating the robot assembly, in particular, during the execution of the application. In particular, in one embodiment a subset of the process parameters to be adapted is selected multiple times, based on the control arrangement; and the process parameter(s) of this subset is or are adapted in such a way that a violation of at least one of the safety monitoring functions is avoidable or is avoided or can be avoided, in particular, while operating the robot assembly, in particular, during the execution of the application.

In one embodiment the system comprises the robot assembly and/or is configured to execute the application of the robot assembly.

A means within the context of the present invention may be designed in hardware and/or software, in particular, may comprise, in particular, a digital processor, in particular, a microprocessor unit (CPU), which is connected by data or signal preferably to a storage system and/or a bus system, and/or may comprise one or more programs or program modules. The CPU may be configured to process commands, which are implemented as a program stored in a storage system; to detect input signals from a data bus and/or to emit output signals to a data bus. A storage system may have one or more, in particular, various storage media, in particular, optical, magnetic, solid-state and/or other non-volatile media. The program may be of such a nature that it embodies or is able to carry out the methods described herein, so that the CPU can execute the steps of such methods and, in so doing, can operate or monitor, in particular, the robot assembly.

In one embodiment one or more process steps are carried out partially or fully automated. The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
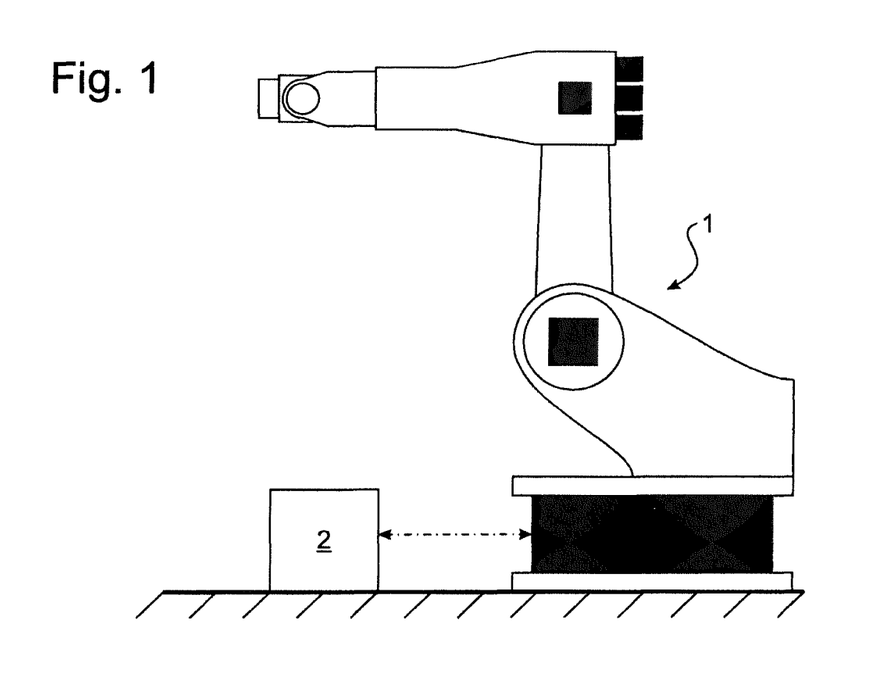
FIG. 1 depicts a system according to an embodiment of the present invention.

FIG. 1 shows a system, according to an embodiment of the present invention, with a robot assembly, which consists of a robot 1, and with a (sub)system in the form of a robot and safety controller 2 for controlling the robot assembly, in particular, for executing an application in the form of a control program 3 of the robot assembly (see FIG. 2), and for monitoring a plurality of parallel activated safety monitoring functions.

Figure 2:
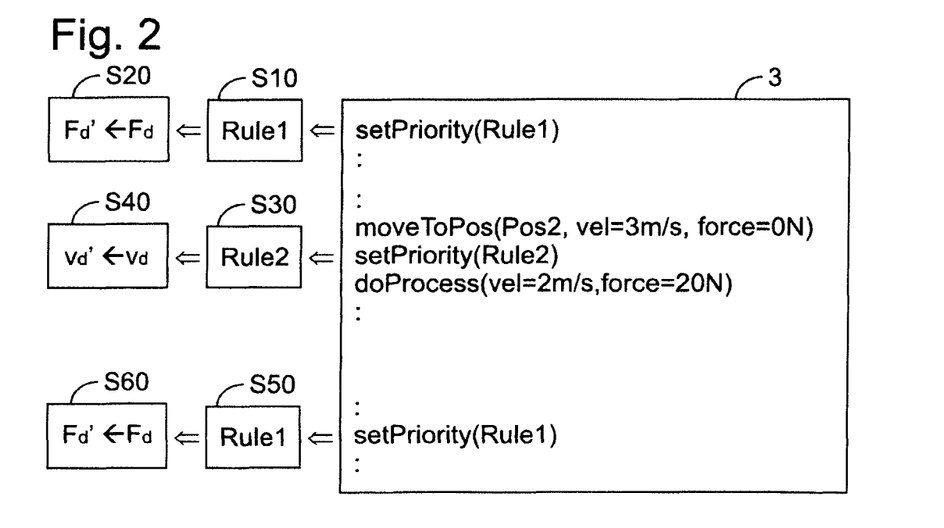
FIG. 2 is a schematic illustration of a method according to an embodiment of the present invention.

The robot and safety controller 2 is designed for carrying out a method, which will be explained in more detail below with reference to FIG. 2, in accordance with one embodiment of the present invention and has for this purpose corresponding means, in particular, in the form of computer program products and/or programs stored thereon or program modules.

The robot and safety controller 2 or the means, which are designed for this purpose, monitors an activated first safety monitoring function ESM1 in the form of a force safety monitoring function, which will be or is violated, when a force, which can be, for example, an external force acting on the robot 1; a force, exerted by the robot 1, or a driving force of the robot 1, exceeds a limit value of 10 N (ESM1: $|F|\leq 10N$), and a parallel-activated second safety monitoring function ESM2 in the form of a speed safety monitoring function, which will be or is violated, when a speed of the robot 1, for example its TCP or a joint, exceeds a limit value of 1 m/s (ESM2: $|v|\leq 1$ m/s).

Linked to the two safety monitoring functions ESM1 and ESM2 is a safety response, for example, a STOP0 of the robot 1, which is triggered by the robot and safety controller 2, only if both the first and the second safety monitoring functions are violated.

Consequently at a sufficiently low external force ($|F|\leq 10$ N) any speed can be achieved, because then the activated and non-violated first safety monitoring function ESM1 counteracts a triggering of the safety response. Conversely at a sufficiently low speed, any force ($|v|\leq 1$ m/s) can be achieved, because then the activated and non-violated second safety monitoring function ESM2 counteracts a triggering of the safety response.

A violation of the first safety monitoring function ESM1 may be avoidable or avoided, in particular, by adapting a desired force $F_d$; and a violation of the second safety monitoring function ESM2 may be avoidable or avoided, in particular, by adjusting a desired speed $v_d$. Consequently in the exemplary embodiment a prescribed set $\{F_d, v_d\}$ of process parameters, by means of which a violation of at least one of the safety monitoring functions is avoidable or is avoided or can be avoided, comprises the desired force $F_d$ and the desired speed $v_d$. These (desired) process parameters can correspond to, in particular, the actual process parameters, monitored by the first or second safety monitoring function ESM1, ESM2 respectively, or can depend on the same variables that specify or preset said actual process parameters.

The control program 3 comprises the process commands, indicated in pseudo code, "move ToPos (Pos2, vel=3 m/s, force=0N)" and "doProcess (vel=2 m/s, force=20N)", which instruct a contact free (see: "force=0N") infeed motion (see: "moveToPos") of the robot 1, into a (process) pose Pos2 at a speed of 3 m/s and a subsequent process motion (see: "doProcess"), in which a process force of 20N is to be exerted on a workpiece (see: "force=20N").

As stated above, the safety response may also be avoided (if possible) by maintaining a sufficiently low force or a sufficiently low speed.

However, it is more advantageous to reduce, if required, the force, during the contact-free planned infeed motion, in order to achieve the desired fast infeed speed of 3 m/s. Conversely, it is more advantageous to reduce the speed, if required, during the process motion, in order to achieve the desired process force of 20 N.

For this purpose the application in the form of the control program 3 includes prioritization commands in the form of "setPriority (RuleX)" that prioritize a first or second selection rule Rule1 or Rule2 respectively of a prescribed control arrangement so as to be higher.

In this case the first selection rule Rule1 determines the first process parameter $F_d$ of the prescribed set $\{F_d, v_d\}$ of process parameters as the selectable subset of process parameters to be adapted; and the second selection rule Rule2 determines the second process parameter $v_d$ of the prescribed set $\{F_d, v_d\}$ of process parameters as the selectable subset of process parameters to be adapted.

Based on a corresponding prioritization command "setPriority (Rule1)" at the beginning of the control program 3, the robot and safety controller 2 prioritizes the first selection rule Rule1 as a global or default selection rule when executing the application in a step S10 and selects accordingly from the set of prescribed process parameters $\{F_d, v_d\}$, by means of which a violation of at least one of the safety monitoring functions is avoidable or is avoided or can be avoided, the first process parameter $F_d$ as a subset.

Consequently in a step S20 during the infeed motion the force, selected by means of the global selection rule Rule1, is optionally adjusted downwards (see "$F_d \rightarrow F_d'$"), in order not to violate the first safety monitoring function ESM1. As a result, a triggering of the STOP0 is advantageously avoided (if possible); and yet at the same time the desired high infeed speed of 3 m/s is achieved.

Based on a subsequent prioritization command "setPriority (Rule2)", the robot and safety controller 2 then prioritize the second selection rule Rule2 so as to be the highest in a step S30, and, therefore, now selects from the set of prescribed process parameters $\{F_d, v_d\}$, by means of which a violation of at least one of the safety monitoring functions can be avoided (if possible), the second process parameter $v_d$ as a subset.

Consequently the speed in a step S40 is optionally adjusted downwards during the now ensuing process motion (see "$v_d \rightarrow v_d'$"), in order not to violate the second safety monitoring function ESM2. As a result, a triggering of the STOP0 is advantageously avoided (if possible); and at the same time the desired high process force of 20 N is achieved.

Based on a subsequent prioritization command "setPriority (Rule1)", the robot and safety controller 2 then prioritize in a step S50 again the first selection rule Rule1 so as to be the highest and, therefore, now selects again the first process parameter $F_d$ as a subset. Consequently in a step S60 after the process motion the force is optionally adjusted downwards again, in order not to violate the first safety monitoring function ESM1.

Although exemplary embodiments have been explained in the foregoing description, it should be noted that a variety of modifications are possible.

Thus, for example, in one modification the robot and safety controller 2 can detect, based on an instructed position control for moving towards the process pose Pos2, that a contact free movement is planned and that the speed of the infeed motion is of primary interest. Then the robot and safety controller 2 can prioritize, based on the process command instructing the position control, for the infeed motion, the first selection rule Rule1 so as to be the highest or can select the first process parameter $F_d$. Conversely the robot and safety controller 2 can detect, based on an instructed force, in particular, an impedance control for carrying out the process motion, that the process force is of primary interest. Then the robot and safety controller 2 can prioritize, based on the process command instructing the impedance control, for the process motion the second selection rule Rule2 so as to be the highest or can select the second process parameter $v_d$. Correspondingly in this modification the prioritization command "setPriority(Rule2)" could also be omitted at the location of the step S30.

Similarly in one modification the robot and safety controller 2 may prioritize the first selection rule Rule1 so as to be higher and, in so doing, select the first process parameter $F_d$ and, if necessary, adjust the force, when the robot 1 is located in a first working space; and vice versa, prioritize the second selection rule Rule2 so as to be higher and, therefore, select the second process parameter $v_d$ and, if necessary, adjust the speed, when the robot 1 is located in a second working space.

In the exemplary embodiment for the sake of a better understanding each selection rule Rule1/Rule2 is bijectively linked to a desired process parameter $F_d/v_d$, which is adapted, if required, in order to avoid a violation of a safety monitoring function, monitoring a corresponding actual process parameter. In one modification, however, in addition or as an alternative, a selection rule may also determine, based on an additional condition, different process parameters as the selectable subset of process parameters to be adapted.

Instead of specifying a selection rule, it is also possible in one modification to specify or prioritize (higher) directly the respective subset of process parameters to be adapted. Similarly it is also possible to specify complementarily one or more process parameters that are to be retained, so that a corresponding selection rule then determines or selects other process parameters from the set of prescribed process parameters, by means of which a violation of at least one of the safety monitoring functions can be avoided (if possible). Thus, for example, a selection rule may determine the second process parameter $v_d$ as the subset, when a force is specified as the process parameter to be retained, and vice versa the first process parameter $F_d$ as a subset, when a speed is specified as a process parameter to be retained.

In addition, it should be noted that the exemplary embodiments are merely examples that are not intended to limit the scope of protection, the applications and configuration in any way. Instead, the foregoing description gives the skilled person a guide for implementing at least one exemplary embodiment, so that it is possible to make various modifications, in particular, with respect to the function and arrangement of the components described herein without departing from the scope of protection, which will become apparent from the claims and these equivalent combinations of features.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS AND SYMBOLS

1 robot (assembly)
2 robot and safety controller (system)

3 control program (application)
Rule1,
Rule2 selection rule
ESM1,
ESM2 safety monitoring function
$F_d$ desired force (process parameter)
$v_d$ desired speed (process parameter)

What is claimed is:

1. A method for controlling a robot assembly that includes at least one robot controlled by a robot controller, the method comprising:
   (a) monitoring operation of the robot assembly by a plurality of parallelly activated safety monitoring functions; and
   (b) performing the following with the robot controller during operation of the robot:
      selecting a subset of process parameters from a prescribed set of process parameters on the basis of a prescribed rule arrangement having at least one selection rule, and
      adapting the selected subset of process parameters to avoid a violation of at least one of the safety monitoring functions;
      wherein steps (b) are repeated multiple times during an execution of an application of the robot assembly while the robot is operating; and
      wherein at least one of:
      the method further comprises prioritizing at least one selection rule of the prescribed rule arrangement on the basis of an application of the robot assembly, or
      the method further comprises prioritizing at least one selection rule of the prescribed rule arrangement on the basis of a state of the robot assembly.

2. The method of claim 1, wherein at least one selection rule of the rule arrangement associates one of the safety monitoring functions with one of the process parameters as a subset to be selected.

3. The method of claim 2, wherein the safety monitoring function is bijectively associated with the process parameter.

4. The method of claim 1, wherein at least one of the safety monitoring functions comprises at least one of:
   a monitoring of a force acting externally on the robot assembly;
   a driving force of the robot assembly;
   a pose of the robot assembly; or
   a time derivative of a pose of the robot assembly.

5. The method of claim 4, wherein the monitoring of the force is parameterizable.

6. The method of claim 1, wherein at least one of the process parameters of the prescribed set depends on at least one of:
   a driving force of the robot assembly;
   a force exerted by the robot assembly;
   a pose of the robot assembly; or
   a time derivative of a pose of the robot assembly.

7. The method of claim 1, further comprising:
   executing a safety response of the robot assembly that is linked to the parallelly activated safety monitoring functions only if none of the safety monitoring functions contravenes the safety response.

8. The method of claim 1, wherein the prescribed rule arrangement comprises a hierarchized plurality of prioritized selection rules.

9. The method of claim 8, wherein the hierarchized plurality of prioritized selection rules are modifiable among themselves.

10. The method of claim 1, wherein at least one of:
    prioritizing the at least one selection rule is repeated multiple times; or
    prioritizing the at least one selection rule occurs during the execution of the application.

11. The method of claim 1, further comprising:
    prioritizing a global selection rule of the prescribed rule arrangement on the basis of an application of the robot assembly.

12. The method of claim 1, further comprising:
    prioritizing at least one selection rule of the prescribed rule arrangement on the basis of a prescribed control command of an application of the robot assembly.

13. The method of claim 12, wherein at least one of:
    prioritizing the at least one selection rule occurs during execution of the application;
    prioritizing the at least one selection rule is repeated multiple times; or
    prioritizing the at least one selection rule is based on a specified prioritization command or a specified process command.

14. The method of claim 1, wherein at least one of:
    prioritizing the at least one selection rule occurs during execution of an application of the robot assembly;
    prioritizing the at least one selection rule is repeated multiple times; or
    prioritizing the at least one selection rule is based on a pose of the robot assembly.

15. The method of claim 1, wherein performance of at least one of the method steps (a) or method steps (b) occurs during operation of the robot assembly.

16. The method of claim 15, wherein the performance of at least one of the method steps occurs during an execution of an application of the robot assembly.

17. A control system for controlling a robot assembly that includes at least one robot, the system comprising:
    monitoring means for monitoring operation of the robot assembly with plurality of parallel activated safety monitoring functions;
    selection means for the selection by the control system during operation of the robot of a subset of process parameters from a prescribed set of process parameters on the basis of a prescribed rule arrangement with at least one selection rule; and
    adaptation means for the adaptation by the control system during operation of the robot of the selected subset of process parameters in order to avoid a violation of at least one of the safety monitoring functions.

18. The control system of claim 17, wherein at least one of:
    the selection means repeats the selection multiple times during an execution of an application of the robot assembly; or
    the adaptation means repeats the adaptation multiple times during an execution of an application of the robot assembly.

19. A robot system comprising:
    a robot assembly that includes at least one robot; and
    a control system for controlling the robot assembly as set forth in claim 17.

20. A computer program product including program code stored on a non-transitory, computer-readable medium, the program code, when executed by a robot controller associated with a robot assembly that includes at least one robot controlled by the robot controller, causing the robot controller to:
    (a) monitor the robot assembly with a plurality of parallelly activated safety monitoring functions; and (b) perform the following:
- select with the robot controller during operation of the robot a subset of process parameters from a prescribed set of process parameters on the basis of a prescribed rule arrangement having at least one selection rule, and
- adapt with the robot controller during operation of the robot the selected subset of process parameters to avoid a violation of at least one of the safety monitoring functions.

\* \* \* \* \*